3,719,657
MONOAZO DYESTUFFS CONTAINING A CARBOX-
AMIDO-4(3H)-QUINAZOLONE GROUP
Kinjiro Hama, Nishinomiya, Nobuo Mishima, Hirakata,
and Kazuo Miyamoto, Takarazuka, Japan, assignors
to Sumitomo Chemical Co., Ltd.
No Drawing. Filed Jan. 12, 1970, Ser. No. 2,405
Claims priority, application Japan, Jan. 17, 1969,
44/3,704
Int. Cl. C09b 29/36, 43/12
U.S. Cl. 260—154          9 Claims

ABSTRACT OF THE DISCLOSURE

Compounds of the formulae:

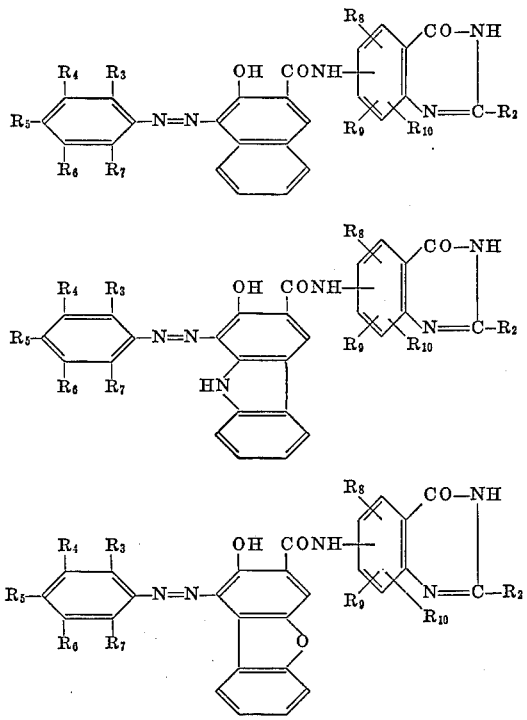

wherein $R_2$ is hydrogen, $C_1$–$C_4$ alkyl, $C_1$–$C_4$ alkoxy (for second and third formulae only), phenyl, benzyl or methyl-, methoxy- or chlorine- substituted benzyl, each of $R_3$, $R_4$, $R_5$, $R_6$ and $R_7$ is hydrogen, chlorine, bromine, $C_1$–$C_4$ alkyl, $C_1$–$C_4$ alkoxy, nitro, cyano, trifluoromethyl, $C_1$–$C_4$ alkoxycarbonyl, $C_1$–$C_4$ alkylsulfonyl, phenylsulfonyl, ureido, carbamoyl, N-$C_1$–$C_4$ alkylcarbamoyl, N-phenylcarbamoyl, sulfamoyl, N-$C_1$–$C_4$ alkylsulfamoyl, N-phenylsulfamoyl, acetyl, propionyl, butyryl, phenylacetyl, benzoyl, acetylamino, propionylamino, butyrylamino, phenylacetylamino or benzoylamino, and each of $R_8$, $R_9$ and $R_{10}$ is hydrogen, chlorine, bromine, $C_1$–$C_4$ alkyl or $C_1$–$C_4$ alkoxy, are provided, which are useful as water insoluble dyestuffs characterized by high fastness to solvents, migration and light.

This invention relates to novel water-insoluble monoazo dyestuffs represented by the general Formula I:

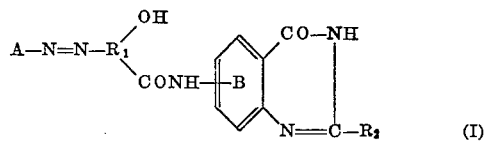

wherein A is a benzene nucleus which may be substituted by groups which do not impart solubility in water, the benzene nucleus B may be substituted by groups which do not impart solubility in water, $R_1$ represents a naphthalene residue in which an azo group, hydroxyl group and carbamoyl group are bonded respectively in the 1-, 2- and 3-positions, carbazol residue in which they are bonded respectively in the 1-, 2- and 3-positions or diphenylene oxide residue in which they are bonded respectively in 4-, 3- and 2-positions and $R_2$ represents hydrogen atom, alkoxy, alkyl, aryl or aralkyl group (the aryl may be substituted by groups which do not impart solubility in water). In the present invention, the "alkyl" and "alkoxy" mean alkyl and alkoxy having 1 to 4 carbon atoms.

This invention also relates to a process for the manufacture of these dyestuffs.

More particularly the present invention relates to water-insoluble monoazo dyestuffs represented by the general Formula II, III or IV:

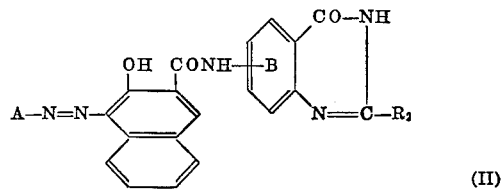

(II)

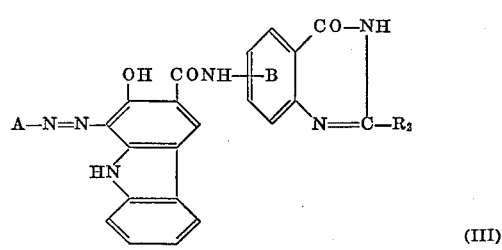

(III)

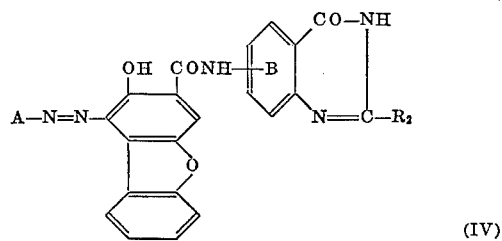

(IV)

wherein A, the benzene nucleus B and $R_2$ are as defined before.

These dyestuffs are prepared according to this invention by coupling a diazotised primary amine of the benzene series which may be substituted by groups which do not impart solubility in water with, as an azo component, an aromatic or heterocyclic o-oxycarboyl compound of amino-4(3H)-quinazolone represented by the following general Formula V, VI or VII:

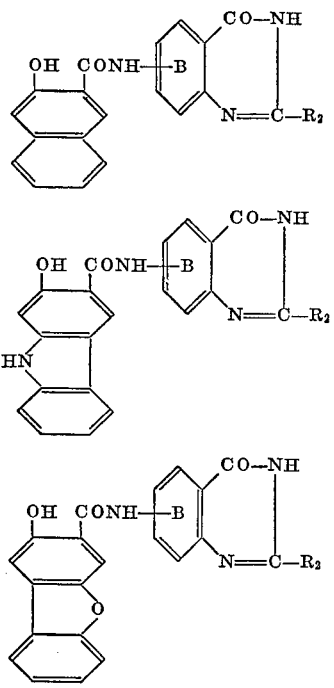

wherein $R_2$ and the benzene nucleus B are respectively as defined before.

These dyestuffs are also prepared according to this invention by condensing an acid halogenide represented by the general Formula VIII, IX or X:

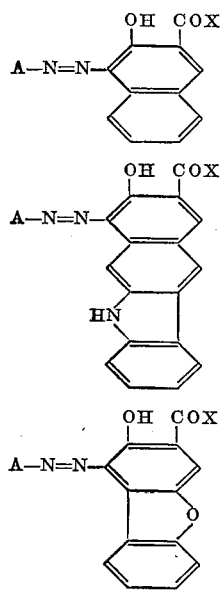

wherein A is as defined before and X represents a halogen atom, with an amino-4(3H)-quinazolone represented by the general Formula XI:

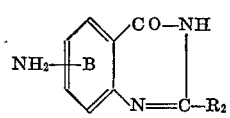

wherein $R_2$ and the benzene nucleus B are as defined before.

As for the primary amine of the benzene series to be used in the process of the present invention, the following formula may be given,

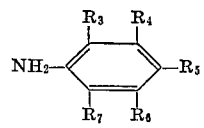

wherein each of $R_3$, $R_4$, $R_5$, $R_6$ and $R_7$ is hydrogen, a halogen, an alkyl, an alkoxy, nitro, cyano, trifluoromethyl, an alkoxycarbonyl, an alkylsulfonyl, an arylsulfonyl, ureido, carbamoyl, an N-alkylcarbamoyl, an N-arylcarbamoyl, sulfamoyl, an N-alkylsulfamoyl, an N-arylsulfamoyl, an acyl, an aroyl, an acylamino or an aroylamino, in which each aryl may be substituted by groups which do not impart solubility in water.

As for the primary amines, there may be mentioned, for example, amino-benzene,
1-amino-2-chlorobenzene,
1-amino-2-fluorobenzene,
1-amino-3-bromobenzene,
1-amino-3-iodobenzene,
1-amino-4-chlorobenzene,
1-amino-2-methylbenzene,
1-amino-2-methoxybenzene,
1-amino-4-methylbenzene,
1-amino-4-methoxybenzene,
1-amino-2-nitrobenzene,
1-aminobenzene-2-carboxylic acid methyl ester,
1-amino-2,4-dimethylbenzene,
1-amino-2,5-dimethoxybenzene,
1-amino-2-methyl-4-chlorobenzene,
1-amino-2-methyl-5-chlorobenzene,
1-amino-2-methyl-4-nitrobenzene,
1-amino-2-methoxy-4-chlorobenzene,
1-amino-2-methoxy-5-chlorobenzene,
1-amino-2-methoxy-4-nitrobenzene,
1-amino-2-nitro-4-methylbenzene,
1-amino-2-nitro-4-methoxybenzene,
1-amino-2,5-dichlorobenzene,
2-amino-4,4'-dichlorodiphenyl ether,
1-amino-2,4,5-trichlorobenzene,
3-amino-benzoic acid amide,
3-amino-4-methoxy-benzoic acid amide,
3-amino-benzoic acid methyl amide,
3-amino-benzoic acid anilide,
3-amino-4-methoxy-benzoic acid anilide,
3-amino-4-methoxy-benzoic acid-2'-methyl-3'-chloranilide,
4-amino-benzoic acid amide,
1-amino-2-methoxy-5-sulfonic acid amide,
1-amino-2-methoxy-5-sulfonic acid anilide,
2-cyano-4-nitroaniline,
3-trifluoromethylaniline,
4-amino-acetophenon,
3-amino-4-chloro-phenylurea,
3-amino-4-chloro-diphenylsulfon,
2-methoxy-5-ethylsulfonylaniline,
2-chloro-4-acetylaminoaniline and
2-chloro-4(2'-chloro)benzoylamino-aniline.

In order to manufacture the water-insoluble dyestuffs of the present invention the above mentioned amines may be diazotised in the usual manner and then coupled with an aromatic or heterocyclic o-oxycarboyl compound of amino-4(3H)-quinazolone having the Formula V, VI or VIII, preferably in the presence of a dispersing agent such as a nonionic active agent, an anionic active agent or a cationic active agent in an alkaline, neutral or acid medium, preferably in a neutral or a weak acid aqueous medium. The coupling reaction may be conducted in a proper organic solvent such as, for example, dimethylformamide, pyridine or methanol.

The aromatic or heterocyclic o-oxycarboyl compound or amino-4(3H)-quinazolone employed in the present invention are more precisely represented by the following formula,

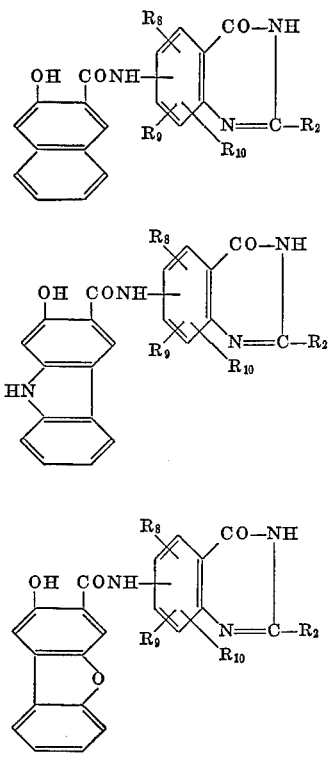

or wherein $R_2$ is as defined before, more precisely, hydrogen, alkoxy, alkyl, phenyl, chlorine-substituted phenyl, alkoxy-substituted phenyl or alkyl-substituted phenyl, and each of $R_8$, $R_9$ and $R_{10}$ is hydrogen, halogen, alkyl or alkoxy.

Examples of the aromatic or heterocyclic o-oxycarboyl compounds of amino-4(3H)-quinazolone are :

5-(2',3'-oxynaphthoylamino)-4(3H)-quinazolone,
6-(2',3'-oxynaphthoylamino)-4(3H)-quinazolone,
7-(2',3'-oxynaphthoylamino)-4(3H)-quinazolone,
8-(2',3'-oxynaphthoxylamino)-4(3H)-quinazolone,
6-(2'-oxycarbazole-3'-carboylamino)-4(3H)-quinazolone,
6-(3'-oxydiphenylene oxide 2'-carboylamino)-4(3H)-quinazolone,
7-(2'-oxycarbazole-3'-carboylamino)-4(3H)-quinazolone,
7-(3'-oxydiphenylene oxide-2'-carboylamino)-4(3H)-quinazolone,
7-(2',3'-oxynaphthoylamino)-6-chloro-4(3H)-quinazolone,
7-(2'-oxycarbazole-3'-carboylamino)-6-chloro-4(3H)-quinazolone,
7-(3'-oxydiphenylene oxide-2'-carboylamino)-6-chloro-4(3H)-quinazolone,
8-(2',3'-oxynaphthoylamino)-6-chloro-4(3H)-quinazolone,
8-(2',3'-oxynaphthoylamino)-6-bromo-4(3H)-qiunazolone,
7-(2',3'-oxynaphthoylamino)-8-methoxy-4(3H)-quinazolone,
7-(2'-oxycarbazole-3'-carboylamino)-8-methoxy-4(3H)-quinazolone,
7-(3'-oxydiphenylene oxide-2'-carboxylamino)-8-methoxy-4(3H)-quinazolone,
8-(2',3'-oxynaphthoylamino)-6-methyl-4(3H)-quinazolone,
5-(2',3'-oxynaphthoylamino)-2-methyl-4(3H)-quinazolone,
5-(2'-oxycarbazole-3'-carboylamino)-2-methyl-4(3H)-quinazolone,
6-(2',3'-oxynaphthoylamino)-2-methoxy-4(3H)-quinazolone,
6-(2',3'-oxynaphthoylamino)-2-methyl-4(3H)-quinazolone,
6-(2'-oxycarbazole-3'-carboylamino)-2-methyl-4(3H)-quinazolone,
6-(2'-oxycarfazole-3'-carboylamino)-2-methoxy-4(3H)-quinazolone,
6-(3'-oxydiphenylene oxide-2'-carboylamino)-2-methyl-4(3H)-quinazolone,
7-(2',3'-oxynaphthoylamino)-2-methyl-4(3H)-quinazolone,
7-(2',3'-oxynaphthoylamino)-2-methoxxy-4(3H)-quinazolone,
7-(3'-oxydiphenylene oxide-2'-carboylamino)-2-methyl-4(3H)-quinazolone,
8-(2',3'-oxynaphthoylamino)-2-methyl-4(3H)-quinazolone,
5-(2',3'-oxynaphthoylamino)-6-bromo-2-methyl-4(3H)-quinazolone,
5-(2'-oxycarbazol-3'-carboylamino)-6-bromo-2-methyl-4(3H)-quinazolone,
6-(2',3'-oxynaphthoylamino)-7-bromo-2-methoxy-4(3H)-quinazolone,
6-(2',3'-oxynaphthoylamino)-7-bromo-2-methyl-4(3H)-quinazolone,
6-(3'-oxydiphenylene oxide-2-carboylamino)-7-bromo-2-methyl-4(3H)-quinazolone,
8-(2',3'-oxynaphthoylamino)-6-bromo-2-methyl-4(3H)-quinazolone,
6-(2',3'-oxynaphthoylamino)-7-chloro-2-methyl-4(3H)-quinazolone,
6-(2',3'-oxynaphthoylamino)-7-chloro-2-methoxy-4(3H)-quinazolone,
6-(2'-oxycarbazole-3'-carboylamino)-7-chloro-2-methyl-4(3H)-quinazolone,
6-(3'-oxydiphenylene oxide-2'-carboylamino)-7-chloro-2-methyl-4(3H)-quinazolone,
7-(2',3'-oxynaphthoylamino)-6-chloro-2-methyl-4(3H)-quinazolone,
7-(2'-oxycarbazol-3'-carboylamino)-6-chloro-2-methyl-4(3H)-quinazolone,
7-(3'-oxydiphenylene oxide-2'-carboylamino)-6-chloro-2-methyl-4(3H)-quinazolone,
8-(2',3'-oxynaphthoylamino)-7-chloro-2-methyl-4(3H)-quinazolone,
8-(2'-oxycarbazole-3'-carboylamino)-7-chloro-2-methyl-4(3H)-quinazolone,
8-(3'-oxydiphenylene oxide-2'-carboylamino)-7-chloro-2-methyl-4(3H)-quinazolone,
8-(2',3'-oxynaphthoylamino)-6-chloro-2-methyl-4(3H)-quinazolone,
7-(2',3'-oxynaphthoylamino)-6-methoxy-2-methyl-4(3H)-quinazolone,
7-(2',3'-oxynaphthoylamino)-8-methoxy-2-methyl-4(3H)-quinazolone,
7-(2'-oxycarbazole-3'-carboylamino)-6-methoxy-2-methyl-4(3H)-quinazolone,
7-(3'-oxydiphenylene oxide-2'-carboylamino)-6-methoxy-2-methyl-4(3H)-quinazolone,
8-(2',3'-oxynaphthoylamino)-6-methoxy-2-methyl-4(3H)-quinazolone,
8-(2',3'-oxynaphthoylamino)-2,6-dimethoxy-4(3H)-quinazolone,
8-(2'-oxycarbazole-3'-carboylamino)-6-methoxy-2-methyl-4(3H)-quinazolone,
8-(3'-oxydiphenylene oxide-2'-carboylamino)-6-methoxy-2-methyl-4(3H)-quinazolone
8-(2',3'-oxynaphthoylamino)-2,6-dimethyl-4(3H)-quinazolone,
8-(2'-oxycarbazole-3'-carboylamino)-2,6-dimethyl-4(3H)-quinazolone, 8-(3'-oxydiphenylene oxide-2'-carboylamino)-2,6-dimethyl-4(3H)-quinazolone,
6-(2',3'-oxynaphthoylamino)-2-phenyl-4(3H)-quinazolone,
6-(2'-oxycarbazole-3'-carboylamino)-2-phenyl-4(3H)-quinazolone,
6-(3'-oxydiphenylene oxide-2'-carboylamino)-2-phenyl-4(3H)-quinazolone,
7-(2',3'-oxynaphthoylamino)-2-phenyl-4(3H)-quinazolone,
7-(2'-oxycarbazole-3'-carboylamino)-2-phenyl-quinazolone,
5-(2',3'-oxynaphthoylamino)-6-bromo-2-phenyl-4(3H)-quinazolone,
5-(2'-oxycarbazole-3'-carboylamino)-6-bromo-2-phenyl-4(3H)-quinazolone,
6-(2',3'-oxynaphthoylamino)-7-bromo-2-phenyl-4(3H)-quinazolone,
6-(3'-oxydiphenylene oxide-2'-carboylamino)-7-bromo-2-phenyl-4(3H)-quinazolone,
6-(2',3'-oxynaphthoylamino)-7-chloro-2-phenyl-4(3H)-quinazolone,
6-(2'-oxycarbazole-3'-carboylamino)-7-chloro-2-phenyl-4(3H)-quinazolone,
6-(3'-oxydiphenylene oxide-2'-carboylamino)-7-chloro-2-phenyl-4(3H)-quinazolone,
8-(2',3'-oxynaphthoylamino)-6-chloro-2-phenyl-4(3H)-quinazolone,
7-(2',3'-oxynaphthoylamino)-6-methoxy-2-phenyl-4(3H)-quinazolone,
7-(2'-oxycarbazole-3'-carboylamino)-6-methoxy-2-phenyl-4(3H)-quinazolone,
7-(3'-oxydiphenylene oxide-2'-carboylamino)-6-methoxy-2-phenyl-4(3H)-quinazolone,
8-(2',3'-oxynaphthoylamino)-6-methyl-2-phenyl-4(3H)-quinazolone,
8-(2'-oxycarbazole-3'-carboylamino)-6-methyl-phenyl-4(3H)-quinazolone,
8-(3'-oxydiphenylene oxide-2'-carboylamino)-6-methyl-2-phenyl-4(3H)-quinazolone,
6-(2',3'-oxynaphthoylamino)-2-(4''''-methoxyphenyl)-4(3H)-quinazolone,
6-(2',3'-oxynaphthoylamino)-2-(4''-methylphenyl-4(3H)-quinazolone,
6-(2'-oxycarbazole-3'-carboylamino)-2-(4''-chlorophenyl)-4(3H)-quinazolone,
6-(2'-oxycarbazole-3'-carboylamino)-2-(4''-methoxyphenyl)-4(3H)-quinazolone,
6-(2'-oxycarbazole-3'-carboylamino)-2-(4''-methylphenyl)-4(3H)-quinazolone,
6-(3'-oxydiphenylene oxide-2'-carboylamino)-2-(4''-chlorophenyl)-4(3H)-quinazolone,
6-(3'-oxydiphenylene oxide-2'-carboylamino)-2-(4''-methoxyphenyl)-4(3H)-quinazolone,
6-(3'-oxydiphenylene oxide-2'-carboylamino)-2-(4''-methylphenyl)-4(3H)-quinazolone,
6-(2',3'-oxynaphthoylamino)-2-benzyl-4(3H)-quinazolone,
5-(2',3'-oxynaphthoylamino)-2-benzyl-4(3H)-quinazolone,
6-(2'-oxycarbazole-3'-carboylamino)-2-benzyl-4(3H)-quinazolone, and
6-(3'-oxydiphenylene oxide-2'-carboylamino)-2-benzyl-4(3H)-quinazolone.

The aromatic or heterocyclic o-oxycarboyl compounds of amino-4(3H)-quinazolone mentioned above can be prepared by any known method. For example, according to the Journal of Organic Chemistry 14, 968 (1949), a corresponding nitroanthranilic acid is acylated and then heated together with acetic anhydride to form benzoxazone, which is then reacted with ammonia in an alcohol to prepare o-acylaminobenzamide, which is then dehydration-cyclized and reduced. Or, in the case of a 2-alkoxy substituent, nitroquinazolinedion is converted to a dichloro compound by a proper halogenating agent, for example, phosphorus oxychloride, which is reacted with a corresponding alcohol to form a 2,4-dialkoxy compound, which is then hydrolyzed to obtain a 2-alkoxy compound, which is then reduced, according to the Journal of the American Chemical Society 55, 1188 (1933). The thus obtained amino-4(3H)-quinazolone can be condensed with an aromatic or heterocyclic o-oxycarboxylic acid chloride in a proper solvent, for example, toluene or pyridine.

The other process of the present invention, that is, the process for making a dyestuff by condensation, may be conducted as follows. Thus, for example, the primary amine is diazotised, and is then coupled with 2,3-oxynaphthoic acid, 2-oxy-carbazole - 3 - carboxylic acid or 3-oxydiphenylene oxide-2-carboxylic acid. The resulting product is then treated with a halogenating agent such as phosphorus trichloride, phosphorus pentachloride, phosphorus oxychloride, phosphorus pentabromide or thionyl chloride, to obtain a carboxylic acid halogenide having the Formula VIII, IX or X, which is preferably recovered from the reaction mixture. The halogenide is condensed with an amino-4(3H)-quinazolone having the Formula XI. In this reaction, however, the reaction mixture of the azocarboxylic acid and the halogenating agent may be subjected to the condensation reaction with the amino-4(3H)-quinazolone.

The amino-4(3H)-quinazolones used in the present invention are more precisely represented by the following formula:

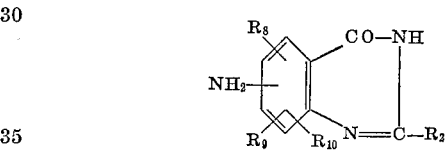

wherein $R_2$, $R_8$, $R_9$ and $R_{10}$ are as defined before.

The amino-4(3H)-quinazolones to be used here are, for example:

5-amino-4(3H)-quinazolone,
6-amino-4(3H)-quinazolone,
7-amino-4(3H)-quinazolone,
8-amino-4(3H)-quinazolone,
7-amino-6-chloro-4(3H)-quinazolone,
8-amino-6-chloro-4(3H)-quinazolone,
8-amino-6-bromo-4(3H)-quinazolone,
7-amino-8-methoxy-4(3H)-quinazolone,
8-amino-6-methyl-4(3H)-quinazolone,
5-amino-2-methyl-4(3H)-quinazolone,
6-amino-2-methyl-4(3H)-quinazolone,
7-amino-2-methyl-4(3H)-quinazolone,
6-amino-2-methoxy-4(3H)-quinazolone,
7-amino-2-methoxy-4(3H)-quinazolone,
8-amino-2-methyl-4(3H)-quinazolone,
5-amino-6-bromo-2-methyl-4(3H)-quinazolone,
6-amino-7-bromo-2-methyl-4(3H)-quinazolone,
8-amino-6-bromo-2-methyl-4(3H)-quinazolone,
6-amino-7-chloro-2-methyl-4(3H)-quinazolone,
7-amino-6-chloro-2-methyl-4(3H)-quinazolone,
8-amino-7-chloro-2-methyl-4(3H)-quinazolone,
8-amino-6-chloro-2-methyl-4(3H)-quinazolone,
7-amino-6-methoxy-2-methyl-4(3H)-quinazolone,
7-amino-8-methoxy-2-methyl-4(3H)-quinazolone,
8-amino-6-methoxy-2-methyl-4(3H)-quinazolone,
8-amino-2,6-dimethyl-4(3H)-quinazolone,
8-amino-2,6-dimethoxy-4(3H)-quinazolone,
6-amino-2-phenyl-4(3H)-quinazolone,
5-amino-2-phenyl-4(3H)-quinazolone,
5-amino-6-bromo-2-phenyl-4(3H)-quinazolone,
6-amino-7-bromo-2-phenyl-4(3H)-quinazolone,
7-amino-6-methoxy-2-phenyl-4(3H)-quinazolone,
8-amino-6-methyl-2-phenyl-4(3H)-quinazolone,
6-amino-2-(4'-chlorophenyl)-4(3H)-quinazolone,
6-amino-2-(4'-methoxyphenyl)-4(3H)-quinazolone, 6-amino-2-(4'-methylphenyl)-4(3H)-quinazolone,
6-amino-2-benzyl-4(3H)-quinazolone, and
5-amino-2-benzyl-4(3H)-quinazolone.

The treatment of the azocarboxylic acid with the halogenating agent is advantageously carried out in an inert solvent such as monochlorobenzene, dichlorobenzene, trichlorobenzene, toluene, xylene or nitrobenzene. It is preferable to add dimethylformamide thereto. Further, the condensation is carried out advantageously in an anhydrous medium. Under such conditions, generally, the reaction is carried out very easily at a temperature within the boiling point range of such ordinary organic solvents as, for example, toluene, monochlorobenzene, dichlorobenzene, trichlorobenzene and nitrobenzene. In order to accelerate this reaction, it is preferable to employ an acid-binding agent, for example, anhydrous sodium acetate or pyridine.

Thus, the insoluble dyestuff of the present invention is obtained at a high yield and in a pure state. However, in order to obtain a particularly pure fast dyeing, it is preferable to purify the dyestuff with the use of a proper solvent such as, for example, pyridine or dimethylformamide, in some cases, under heating.

The novel dyestuffs obtained by the present invention are water-insoluble and are characterized by having a very high fastness to solvents, migration and light. The dyestuffs of the invention can be used for the production of printing inks, lacquers and paints and further for coloring rubbers, natural resins and synthetic resins, coloring spun substances and dyeing and printing fabrics and paper by an ordinary pigment printing or dyeing process.

The present invention will be illustrated by the following examples in which all parts and percentages are by weight unless otherwise specified.

EXAMPLE 1

16.6 parts of 3-amino-4-methoxybenzoic acid amide is dissolved in 250 parts of ice water and 94 parts of 35% hydrochloric acid and are diazotised with the addition of 23.2 parts of a 30% sodium nitrite solution. Apart from the above, 34.5 parts of 6-(2',2'-oxynaphthoylamino)-2-methyl-4(3H)-quinazolone is dissolved in 30 parts of a 40% sodium hydroxide solution, 250 parts of water and 200 parts of methanol. Then 20 parts of a 5% aqueous solution of a dispersing agent (a reaction product of 1 mol of oleyl alcohol and 30 mols of ethylene oxide) is further added thereto. This solution is then poured together with the diazo solution during 30 minutes with severe stirring into a solution consisting of 400 parts of water, 12 parts of glacial acetic acid, 100 parts of a 30% sodium acetate solution and 20 parts of a 5% solution of the above mentioned dispersing agent. When the solution is stirred for 30 minutes after pouring, the coupling is completed. It is further stirred at 90 to 95° C. for 30 minutes and filtered to separate crystals, which are washed with water and dried at 60° C. The obtained product is treated with 400 parts of dimethylformamide at the boiling temperature for 2 hours and the mixture is cooled and filtered to separate crystals, which are washed with methanol and dried. There is obtained a clear bluish red water-insoluble dyestuff having the below mentioned structural formula, high in tinctorial strength and having a very high fastness to solvents, light and migration:

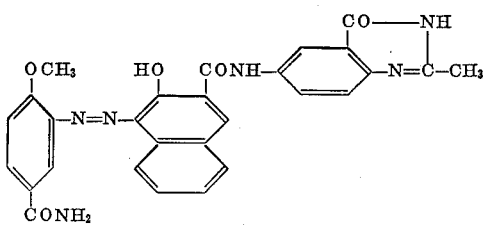

EXAMPLE 2

16.6 parts of 3-amino-4-methoxybenzoic acid amide is dissolved in 250 parts of ice water and 94 parts of 35% hydrochloric acid and is diazotised with the addition of 23.2 parts of a 30% sodium nitrite solution. Separately, 33.1 parts of 6-(2',3'-oxynaphthoylamino)-4(3H)-quinazolone is dissolved in 30 parts of a 40% sodium hydroxide solution and 400 parts of water. Then 20 parts of a 5% aqueous solution of a dispersing agent (a reaction product of 1 mol of oleyl alcohol and 30 mols of ethylene oxide) is further added thereto. The resulting solution is then poured together with the diazo solution during 30 minutes with severe stirring into a solution consisting of 400 parts of water, 12 parts of glacial acetic acid, 100 parts of a 30% sodium acetate solution and 20 parts of a 5% solution of the above mentioned dispersing agent. After pouring, the solution is stirred for 30 minutes and filtered to separate crystals, which are washed with water and dried at 60° C. When the obtained product is treated with 350 parts of dimethylformamide at the boiling temperature for 2 hours and the mixture is cooled and then filtered to separate crystals, which are washed with methanol and dried, there is obtained a clear red water-insoluble dyestuff having the below mentioned structural formula and having a high fastness to solvents, light and migration:

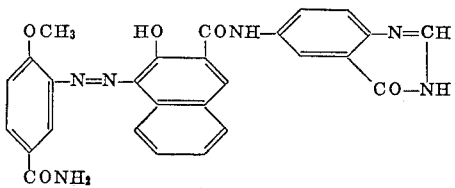

EXAMPLE 3

A diazo solution is prepared by the process mentioned in Example 1 from 16.6 parts of 3-amino-4-methoxybenzoic acid amide. Separately, 40.7 parts of 6-(2',3'-oxynaphthoylamino)-2-phenyl-4(3H)-quinazoline is dissolved in 30 parts of 40% sodium hydroxide solution, 200 parts of water and 200 parts of methane. Then 20 parts of a 5% aqueous solution of a dispersing agent (a reaction product of 1 mol of oleyl alcohol and 30 mols of ethylene oxide) is further added thereto. The resulting solution is then poured together with the diazo solution during 30 minutes with severe stirring into a solution consisting of 450 parts of water, 12 parts of glacial acetic acid, 100 parts of a 30% sodium acetate solution and 20 parts of a 5% solution of the above mentioned dispersing agent. After pouring, the solution is stirred for 30 minutes and is further stirred at 90 to 95° C. for 30 minutes.

It is then filtered to separate crystals which are washed with water, and dried at 60° C. to obtain a red water-insoluble dyestuff. When it is treated with 400 parts of dimethylformamide at the boiling temperature for 2 hours, and the mixture is cooled and then filtered, to separate crystals, which are washed with methanol and dried, there is obtained a red water-insoluble dyestuff having the below mentioned structural formula, soft in grains and having a high fastness to migration, solvents and light:

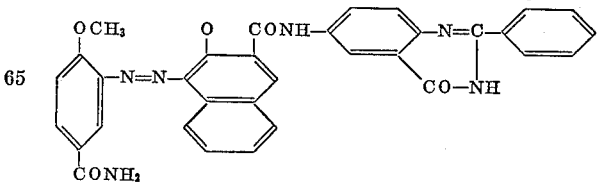

EXAMPLES 4–44

Table 1 indicates combinations of some diazo components and azo components which are used to obtain water-insoluble dyestuff having the same favorable fastness when coupled by the process mentioned in the above described examples.

TABLE 1

| No. | Diazo component | Azo components | Tint |
|---|---|---|---|
| 4 | Aminobenzene | 5-(2',3'-oxynaphthoylamino)-4(3H)-quinazolone | Red. |
| 5 | do | 6-(2',3'-oxynaphthoylamino)-4(3H)-quinazolone | Red. |
| 6 | 1-amino-2-chlorobenzene | 6-(2',3'-oxynaphthoylamino)-4(3H)-quinazolone | Yellowish red. |
| 7 | do | 6 (2'-oxycarbazole-3'-carboylamino)-4(3H)-quinazolone | Yellowish brown. |
| 8 | do | 6-(3'-oxydiphenylene oxide-2'-carboylamino)-4(3H)-quinazolone | Brown. |
| 9 | do | 7-(2',3'-oxynaphthoylamino)-4(3H)-quinazolone | Yellowish red. |
| 10 | 1-amino-2-methylbenzene | do | Red. |
| 11 | do | 8-(2',3'-oxynaphthoylamino)-4(3H)-quinazolone | Red. |
| 12 | do | 7-(2',3'-oxynaphthoylamino)-6-chloro-4(3H)-quinazolone | Red. |
| 13 | do | 7-(2'-oxycarbazole-3'-carboylamino)-6-chloro-4(3H)-quinazolone | Brown. |
| 14 | do | 7-(2',3'-oxynaphthoylamino)-8-methoxy-4(3H)-quinazolone | Bluish red. |
| 15 | 1-amino-4-chlorobenzene | 7-(2',3'-oxynaphthoylamino)-6-methyl-4(3H)-quinazolone | Red. |
| 16 | do | 7-(3'-oxydiphenylene oxide-2'-carboylamino)-6-methyl-4(3H)-quinazolone | Brown. |
| 17 | do | 6-(2',3'-oxynaphthoylamino)-2-methyl-4(3H)-quinazolone | Red. |
| 18 | 1-amino-2,4-dimethylbenzene | 6-(2',3'-oxynaphthoylamino)-2-methoxy-4(3H)-quinazolone | Bordeaux. |
| 19 | do | 6-(2'-oxycarbazole-3'-carboylamino)-2-methyl-4(3H)-quinazolone | Reddish brown. |
| 20 | do | 6-(3'-oxydiphenylene oxide-2'-carboylamino)-2-methyl-4(3H)-quinazolone | Do. |
| 21 | do | 7-(2',3'-oxynaphthoylamino)-2-methyl-4(3H)-quinazolone | Bluish red. |
| 22 | 1-amino-2-methyl-4-chlorobenzene | 7-(2',3'-oxynaphthoylamino)-2-methoxy-4(3H)-quinazolone | Red. |
| 23 | do | 6-(2',3'-oxynaphthoylamino)-7-bromo-2-methyl-4(3H)-quinazolone | Red. |
| 24 | do | 7-(2',3'-oxynaphthoylamino)-6-chloro-2-methyl-4(3H)-quinazolone | Red. |
| 25 | 3-amino-4-methoxy-benzoic acid anilide | 6-(2',3'-oxynahthoylamino)-7-chloro-2-methyl-4(3H)-quinazolone | Red. |
| 26 | do | 8-(2',3'-oxynaphthoylamino)-6-chloro-2-methyl-4(3H)-quinazolone | Red. |
| 27 | do | 7-(2',3'-oxynaphthoylamino)-6-methoxy-2-methyl-4(3H)-quinazolone | Bordeaux. |
| 28 | do | 7-(2',3'-oxynaphthoylamino)-8-methoxy-2-methyl-4(3H)-quinazolone | Do. |
| 29 | do | 8-(2',3'-oxynaphthoylamino)-2,6-dimethyl-4(3H)-quinazolone | Bluish red. |
| 30 | do | 6-(2',3'-oxynaphthoylamino)-2-phenyl-4(3H)-quinazolone | Do. |
| 31 | 1-amino-4-methylbenzene | do | Red. |
| 32 | do | 6-(2'-oxycarbazole-3'-carboylamino)-2-phenyl-4(3H)-quinazolone | Brown. |
| 33 | do | 6-(3'-oxydiphenylene oxide-2'-carboylamino)-2-phenyl-4(3H)-quinazolone | Do. |
| 34 | do | 7-(2',3'-oxynaphthoylamino)-2-phenyl-4(3H)-quinazolone | Red. |
| 35 | do | 7-(2'-oxycarbazole-3'-carboylamino)-2-phenyl-4(3H)-quinazolone | Brown. |
| 36 | do | 6-(2',3'-oxynaphthoylamino)-7-bromo-2-phenyl-4(3H)-quinazolone | Red. |
| 37 | do | 6-(3'-oxydiphenylene oxide-2'-carboylamino)-7-bromo-2-phenyl-4(3H)-quinazolone | Brown. |
| 38 | do | 6-(2',3'-oxynaphthoylamino)-7-chloro-2-phenyl-4(3H)-quinazolone | Red. |
| 39 | do | 8-(2',3'-oxynaphthoylamino)-6-chloro-2-phenyl-4(3H)-quinazolone | Red. |
| 40 | do | 7-(2',3'-oxynaphthoylamino)-6-methoxy-2-phenyl-4(3H)-quinazolone | Bluish red. |
| 41 | 1-amino-2-nitro-4-methylbenzene | 6-(2',3'-oxynaphthoylamino)-2-(4''-chlorophenyl)-4(3H)-quinazolone | Red. |
| 42 | do | 6-(2',3'-oxynaphthoylamino)-2-(4''-methoxyphenyl)-4(3H)-quinazolone | Bordeaux. |
| 43 | do | 6-(2',3'-oxynaphthoylamino)-2-(4''-methylphenyl)-4(3H)-quinazolone | Bluish red. |
| 44 | do | 6-(2',3'-oxynaphthoylamino)-2-benzyl-4(3H)-quinazolone | Red. |

EXAMPLE 45

30.6 parts of a dyestuff obtained by coupling diazotised 1-amino-2-methylbenzene with 2,3-oxynaphthoic acid is suspended in 400 parts of o-dichlorobenzene, and 16.7 parts of thionyl chloride is gradually added thereto at the room temperature. The mixture is stirred at 100° C. until the production of hydrochloric acid ceases.

Then the temperature is lowered to 70° C. and excess thionyl chloride, hydrogen chloride and sulfur dioxide are removed under a reduced pressure. To this solution is added a solution prepared by dissolving 17.3 parts of 6-amino-2-methyl-4(3H)-quinazolone in 200 parts of o-dichlorobenzene and 70 parts of anhydrous pyridine. Then the mixture is kept at 120 to 125° C. for about 15 hours. The temperature is then lowered and the resulting red product is separated by filtration, washed with o-dichlorobenzene at 60° C. until the filtrate is no longer colored, then washed with methanol and dried at 60° C. There is obtainew a bluish red water-insoluble dyestuff having the below mentioned structural formula, high in tinctorial strength and excellent in fastness to solvent, light and migration:

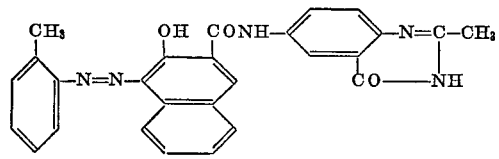

EXAMPLE 46

70.2 parts of a dyestuff obtained by coupling diazotised 1-amino-2-nitro-4-methylbenzene with 2,3-oxynaphthoic acid are suspended in 90.0 parts of chlorobenzene, and 33.4 parts of thionyl chloride is gradually added thereto at the room temperature. The mixture is heated to 100° C. and stirred until the generation of hydrochloric acid ceases. Then the temperature is lowered to 20° C. and the precipitated crystals are separated by filtration, washed with benzene and dried at 60° C. under a reduced pressure. 33.25 parts of the thus obtained acid chloride is stirred together with 400 parts of o-dichlorobenzene and 20 parts of anhydrous pyridine and the mixture is heated to 80° C. To this mixture is added a solution prepared by dissolving 23.7 parts of 6-amino-2-phenyl-4(3H)-quinazolone in 200 parts of o-dichlorobenzene and 50 parts of anhydrous pyridine and the mixture is then kept at 120 to 125° C. for about 15 hours. Then the temperature is lowered to 60° C. and the resulting product is separated by filtration, washed with o-dichlorobenzene at 60° C. until the filtrate is no longer colored, then washed with methanol and dried at 60° C., to obtain a red water-insoluble dyestuff having the below mentioned structural formula and having a favorable fastness to light, migration and solvents:

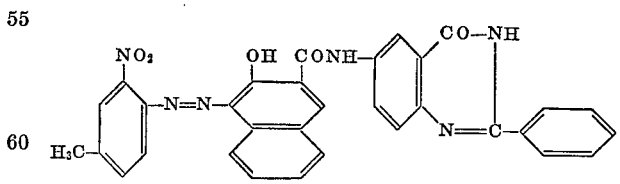

EXAMPLES 47–93

Table 2 shows additional examples which were conducted in the same manner as that described above.

TABLE 2

| No. | Diazo component | Azo component | Condensed amine | Tint |
|---|---|---|---|---|
| 47 | 1-amino-4-methylbenzene | 2,3-oxynaphthoic acid | 5-amino-4(3H)-quinazolone | Red. |
| 48 | do | do | 6-amino-4(3H)-quinazolone | Red. |
| 49 | 1-amino-4-chlorobenzene | do | do | Red. |
| 50 | do | 2-oxycarbazole-3-carboxylic acid | do | Brown. |
| 51 | do | 3-oxydiphenylene oxide-2-carboxylic acid | do | Do. |
| 52 | do | 2,3-oxynaphthoic acid | 7-amino-4(3)-quinazolone | Red. |
| 53 | do | do | 8-amino-4(3H)-quinazolone | Do. |

TABLE 2—Continued

| No. | Diazo component | Azo component | Condensed amine | Tint |
|---|---|---|---|---|
| 54 | 1-amino-4-methylbenzene | 2,3-oxynaphthoic acid | 7-amino-6-chloro-4(3H)-quinazolone | Yellowish red. |
| 55 | do | 2-oxycarbazole-3-carboxylic acid | do | Brown. |
| 56 | 3-amino-4-methoxybenzoic acid amide | 2,3-oxynaphthoic acid | 7-amino-6-methyl-4(3H)-quinazolone | Red. |
| 57 | do | do | 7-amino-8-methoxy-4(3H)-quinazolone | Bluish red. |
| 58 | 1-amino-4-chlorobenzene | do | 6-amino-2-methyl-4(3H)-quinazolone | Brown. |
| 59 | do | 3-oxydiphenylene-2-carboxylic acid | do | Brown. |
| 60 | 1-amino-4-chlorobenzene | 2-oxycarbazole-3-carboxylic acid | 6-amino-2-methyl-4(3H)-quinazolone | Reddish brown. |
| 61 | 1-amino-2-chlorobenzene | 2,3-oxynaphthoic acid | do | Red. |
| 62 | 1-amino-2,4-dimethoxybenzene | do | 6-amino-2-methoxy-4(3H)-quinazolone | Bordeaux. |
| 63 | do | 3-oxyphenylene oxide-2-carboxylic acid | do | Reddish brown. |
| 64 | 1-amino-2,4-dimethoxybenzene | 2,3-oxynaphthoic acid | 7-amino-2-methyl-4(3H)-quinazolone | Bluish red. |
| 65 | do | do | 6-amino-7-bromo-2-methyl-4(3H)-quinazolone. | Do. |
| 66 | do | do | 7-amino-6-chloro-2-methyl-4(3H)-quinazolone. | Do. |
| 67 | 1-amino-2-methyl-4-chlorobenzene | do | 6-amino-7-chloro-2-methyl-4(3H)-quinazolone. | Red. |
| 68 | do | 2-oxycarbazole-3-carboxylic acid | 6-amino-7-chloro-2-methoxy-4(3H)-quinazolone. | Brown. |
| 69 | do | 2,3-oxynaphthoic acid | 8-amino-6-chloro-2-methyl-4(3H)-quinazolone. | Red. |
| 70 | 1-amino-2-nitro-4-methylbenzene | do | 7-amino-6-methoxy-2-methyl-4(3H)-quinazolone. | Bluish red. |
| 71 | do | do | 7-amino-8-methoxy-2-methyl-4(3H)-quinazolone. | Bordeaux. |
| 72 | 1-amino-2-nitro-4-methylbenzene | 2,3-oxynaphthoic acid | 8-amino-2,6-dimethyl-4(3H)-quinazolone | Red. |
| 73 | do | 2-oxycarbazole-3-carboxylic acid | 6-amino-2-phenyl-4(3H)-quinazolone | Brown. |
| 74 | 1-amino-2,5-dichlorobenzene | 2,3-oxynaphthoic acid | do | Red. |
| 75 | 1-amino-2,4-dimethylbenzene | do | do | Red. |
| 76 | 3-amino-4-methoxy-benzoic acid amide | do | do | Red. |
| 77 | do | 3-oxydiphenylene oxide-2-carboxylic acid | do | Brown. |
| 78 | do | 2,3-oxynaphthoic acid | 7-amino-2-phenyl-4(3H)-quinazolone | Red. |
| 79 | do | do | 6-amino-7-chloro-2-phenyl-4(3H)-quinazolone. | Red. |
| 80 | do | 2-oxycarbazole-3-carboxylic acid | do | Brown. |
| 81 | do | 2,3-oxynaphthoic acid | 7-amino-6-methoxy-2-phenyl-4(3H)-quinazolone. | Bluish red. |
| 82 | do | do | 6-amino-2-(4'-chlorophenyl)-4(3H)-quinazolone. | Red. |
| 83 | do | do | 6-amino-2-(4'-methylphenyl)-4(3H)-quinazolone. | Red. |
| 84 | do | do | 6-amino-2-(4'-methoxyphenyl)-4(3H)-quinazolone. | Red. |
| 85 | do | do | 6-amino-2-benzyl-4(3H)-quinazolone | Bluish red. |
| 86 | 2-cyano-4-nitroaniline | do | 6-amino-2-methyl-4(3H)-quinazolone | Red. |
| 87 | 3-trifluoromethylaniline | do | do | Red. |
| 88 | 4-amino-acetophenon | do | do | Red. |
| 89 | 3-amino-4-chlorophenylurea | do | do | Red. |
| 90 | 3-amino-4-chlorodiphenylsulfon | do | do | Red. |
| 91 | 2-methoxy-5-ethylsulfonylaniline | do | do | Red. |
| 92 | 2-chloro-4-acetylaminoaniline | do | do | Red. |
| 93 | 2-chloro-4-(2'-chloro)-benzoylaminoaniline | do | do | Red. |

What we claim is:

1. A compound selected from the group consisting of compounds of the formulae:

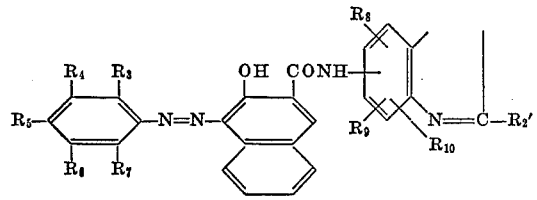

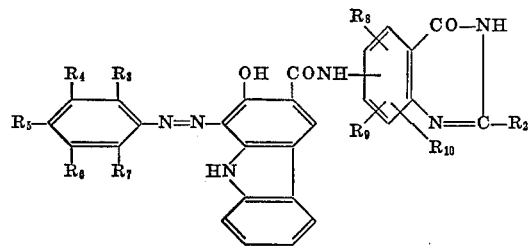

and

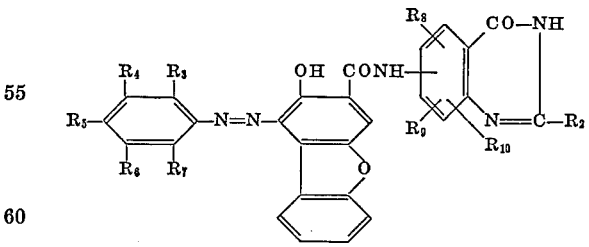

wherein $R_2'$ is hydrogen, $C_1$–$C_4$ alkyl, phenyl, benzyl or methyl-, methoxy- or chlorine-substituted benzyl, $R_2$ is hydrogen, $C_1$–$C_4$ alkyl, $C_1$–$C_4$ alkoxy, phenyl, benzyl or methyl-, methoxy- or chlorine-substituted benzyl, each of $R_3$, $R_4$, $R_5$, $R_6$ and $R_7$ is hydrogen, chlorine, bromine, $C_1$–$C_4$ alkyl, $C_1$–$C_4$ alkoxy, nitro, cyano, trifluoromethyl, $C_1$–$C_4$ alkoxycarbonyl, $C_1$–$C_4$ alkylsulfonyl, phenylsulfonyl, ureido, carbamoyl, N-$C_1$–$C_4$ alkylcarbamoyl, N-phenylcarbamoyl, sulfamoyl, N-$C_1$–$C_4$ alkylsulfamoyl, N-phenylsulfamoyl, acetyl, propionyl, butyryl, phenylacetyl, benzoyl, acetylamino, propionylamino, butyrylamino, phenylacetylamino or benzoylamino, and each of $R_8$, $R_9$ and $R_{10}$ is hydrogen, chlorine, bromine, $C_1$–$C_4$ alkyl or $C_1$–$C_4$ alkoxy.

2. A compound according to claim 1, namely

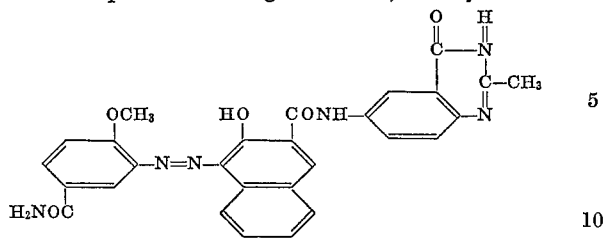

3. A compound according to claim 1, namely

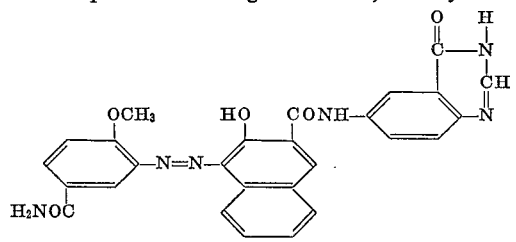

4. A compound according to claim 1, namely

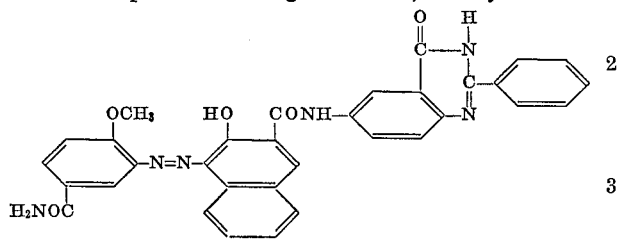

5. A compound according to claim 1, namely

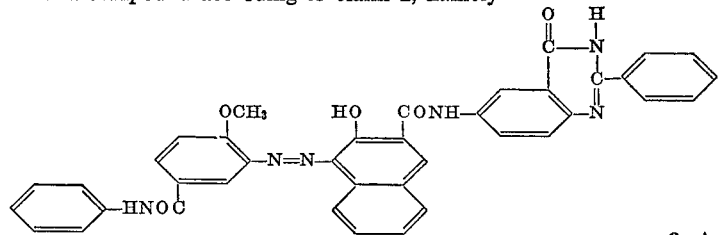

6. A compound according to claim 1, namely

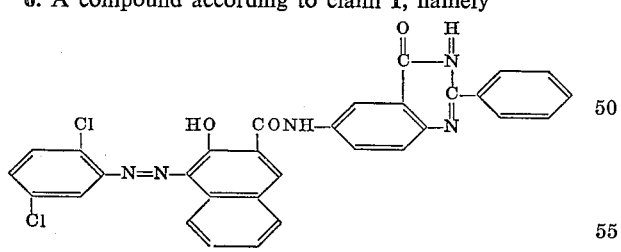

7. A compound according to claim 1, namely

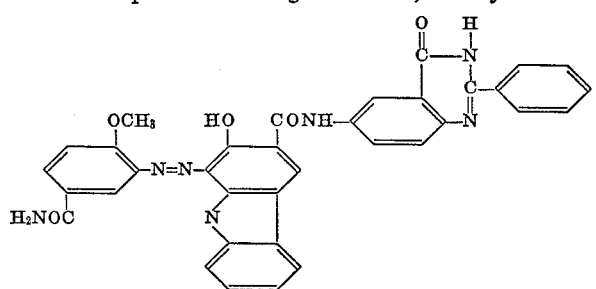

8. A compound according to claim 1, namely

9. A compound according to claim 1, namely

References Cited

UNITED STATES PATENTS

| | | | |
|---|---|---|---|
| 3,118,870 | 1/1964 | Dietz et al. | 260—154 |
| 3,079,374 | 2/1963 | Straley et al. | 260—152 |
| 3,086,004 | 4/1963 | Gross et al. | 260—152 X |
| 3,113,938 | 12/1963 | Nakaten et al. | 260—154 X |
| 1,012,055 | 12/1911 | Bogert | 260—154 |
| 2,364,351 | 12/1944 | Dickey | 260—154 |
| 2,908,678 | 10/1959 | Goebel et al. | 260—154 |
| 3,154,532 | 10/1964 | Weidinger et al. | 260—154 |
| 3,157,631 | 11/1964 | Weidinger et al. | 260—154 |

OTHER REFERENCES

Ciba, Chemical Abstracts, vol. 58, 9267–9268 (1963).
Giuseppe, Chemical Abstracts, vol. 71, p. 80 (1969).

FLOYD D. HIGEL, Primary Examiner

U.S. Cl. X.R.

106—23, 288 Q; 117—138.8 R, 139, 154; 260—152, 164, 203, 204, 256.4 Q